United States Patent
Chen et al.

(10) Patent No.: US 7,299,992 B1
(45) Date of Patent: Nov. 27, 2007

(54) DRINKING WATER FOUNTAIN HAVING MIXED HOT AND COLD WATER

(76) Inventors: Jui-Chien Chen, 321, Sec. 4, Lu He Rd., Lu Gang, Changhua Hsien (TW); Jui-Ching Chen, 321, Sec. 4, Lu He Rd., Lu Gang, Changhua Hsien (TW)

( * ) Notice: Subject to any disclaimer, the term of this patent is extended or adjusted under 35 U.S.C. 154(b) by 526 days.

(21) Appl. No.: 11/008,547

(22) Filed: Dec. 9, 2004

(51) Int. Cl.
*G05D 23/185* (2006.01)
*B67D 5/62* (2006.01)
*B60T 8/36* (2006.01)

(52) U.S. Cl. .............................. 236/12.11; 222/146.2; 137/599.01

(58) Field of Classification Search ............. 236/12.11; 137/599.01, 801; 222/129.1, 130, 144.5, 222/145.1, 145.5, 146.2, 146.6
See application file for complete search history.

(56) References Cited

FOREIGN PATENT DOCUMENTS

EP   1574798 A1 * 9/2005
JP   04068279 A * 3/1992

* cited by examiner

*Primary Examiner*—Chen Wen Jiang
(74) *Attorney, Agent, or Firm*—Alan Kamrath; Kamrath & Associates P.A.

(57) ABSTRACT

A drinking water fountain includes a valve body, a heating device, a control valve, a cold water inlet conduit, a cold water outlet conduit, a heating conduit, and a hot water inlet conduit. Thus, the drinking water fountain can provide drinking water, including cold water, hot water and mixed water. In addition, the control valve is used to control the drinking water flowing outward from the water outlet pipe, including cold water, hot water and mixed water, thereby facilitating a user drinking the drinking water.

9 Claims, 5 Drawing Sheets

DRINKING WATER FOUNTAIN HAVING MIXED HOT AND COLD WATER

BACKGROUND OF THE INVENTION

1. Field of the Invention

The present invention relates to a drinking water fountain, and more particularly to a drinking water fountain having mixed hot and cold water so as to provide cold water, hot water and mixed water.

2. Description of the Related Art

A conventional drinking water fountain comprises a valve body having a side formed with a valve chamber, a control valve rotatably mounted in the valve chamber of the valve body and connected to a water filter, and a water outlet pipe mounted on the valve body and connected to the control valve. Thus, the filtered water from the water filter is supplied to the control valve which is switched to control the flow rate of the filtered water flowing outward from the water outlet pipe. However, the conventional drinking water fountain only provides cold drinking water and cannot provide hot drinking water, thereby limiting the versatility of the conventional drinking water fountain.

SUMMARY OF THE INVENTION

In accordance with the present invention, there is provided a drinking water fountain, comprising: a valve body having a side formed with a valve chamber, a lower portion provided with a heating device and an upper portion provided with a mixed chamber; a control valve rotatably mounted in the valve chamber of the valve body; a cold water inlet conduit mounted in the valve body and having a first end connected to a water inlet port of the control valve; a cold water outlet conduit mounted in the valve body and having a first end connected to a first water outlet port of the control valve and a second end connected to the mixed chamber of the valve body; a heating conduit mounted in the valve body and having a first end connected to a second water outlet port of the control valve and a second end connected to the heating device; and a hot water inlet conduit mounted in the valve body and having a first end connected to the heating device and a second end connected to the mixed chamber of the valve body.

The primary objective of the present invention is to provide a drinking water fountain having mixed hot and cold water so as to provide cold water, hot water and mixed water.

Another objective of the present invention is to provide a drinking water fountain that can provide drinking water, including cold water, hot water and mixed water.

A further objective of the present invention is to provide a drinking water fountain that can provide non-drinking water, including cold water, hot water and mixed water.

A further objective of the present invention is to provide a drinking water fountain, wherein the control valve is used to control the drinking water flowing outward from the water outlet pipe, including cold water, hot water and mixed water, thereby facilitating a user drinking the drinking water.

A further objective of the present invention is to provide a drinking water fountain, wherein the second control valve is used to control the non-drinking water flowing outward from the second water outlet pipe, including cold water, hot water and mixed water, thereby facilitating a user using the non-drinking water.

Further benefits and advantages of the present invention will become apparent after a careful reading of the detailed description with appropriate reference to the accompanying drawings.

DETAILED DESCRIPTION OF THE INVENTION

Figure 1:
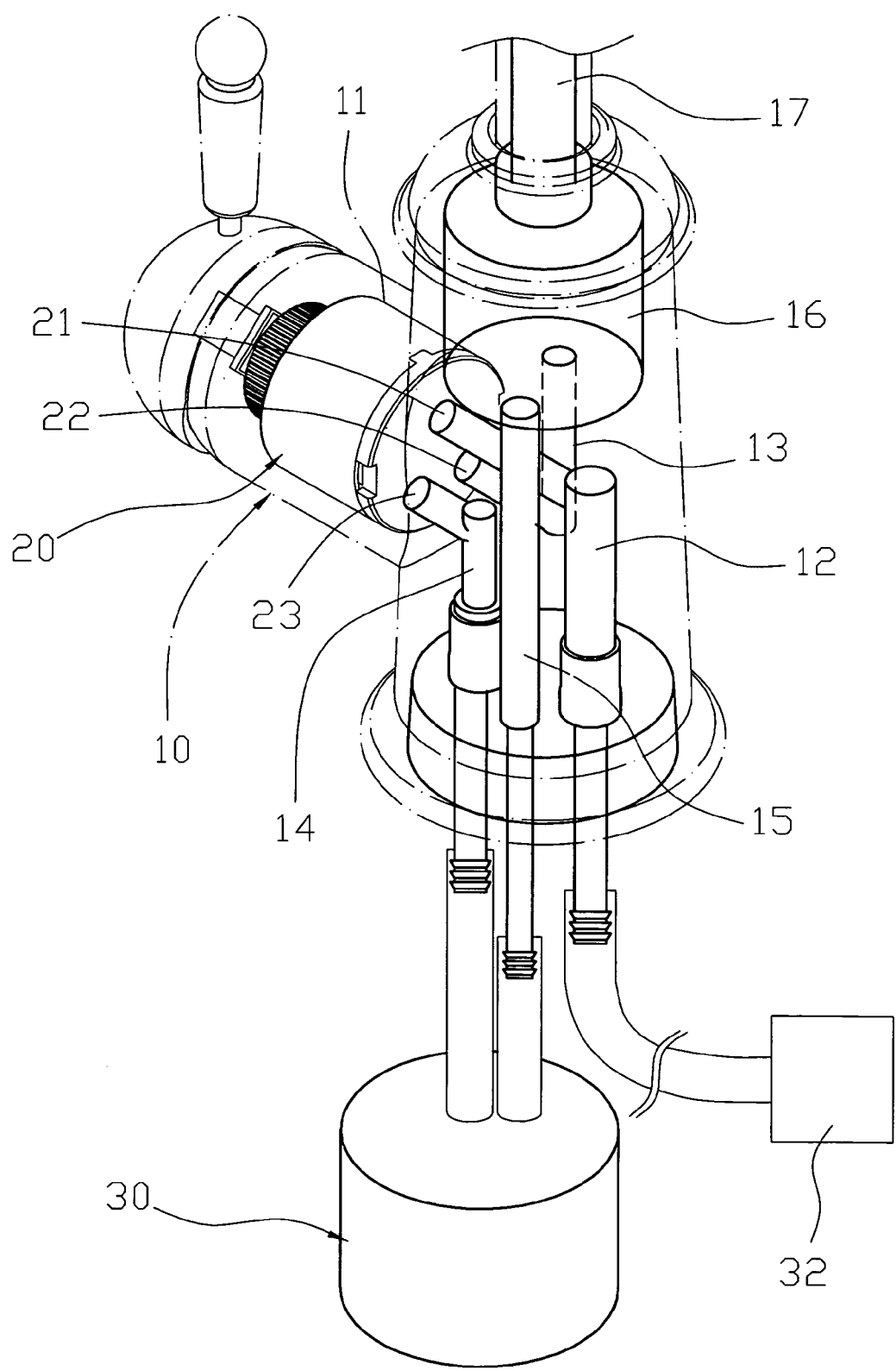
FIG. 1 is a perspective view of a drinking water fountain in accordance with the preferred embodiment of the present invention.

Referring to the drawings and initially to FIG. 1, a drinking water fountain in accordance with the preferred embodiment of the present invention comprises a valve body 10 having a side formed with a valve chamber 11, a lower portion provided with a heating device 30 and an upper portion provided with a mixed chamber 16, a control valve 20 rotatably mounted in the valve chamber 11 of the valve body 10, a water outlet pipe 17 mounted on the valve body 10 and connected to the mixed chamber 16 of the valve body 10, a cold water inlet conduit 12 mounted in the valve body 10 and having a first end connected to a water inlet port 21 of the control valve 20 and a second end connected to a water filter 32, a cold water outlet conduit 13 mounted in the valve body 10 and having a first end connected to a first water outlet port 22 of the control valve 20 and a second end connected to the mixed chamber 16 of the valve body 10, a heating conduit 14 mounted in the valve body 10 and having a first end connected to a second water outlet port 23 of the control valve 20 and a second end connected to the heating device 30, and a hot water inlet conduit 15 mounted in the valve body 10 and having a first end connected to the heating device 30 and a second end connected to the mixed chamber 16 of the valve body 10.

Figure 2:
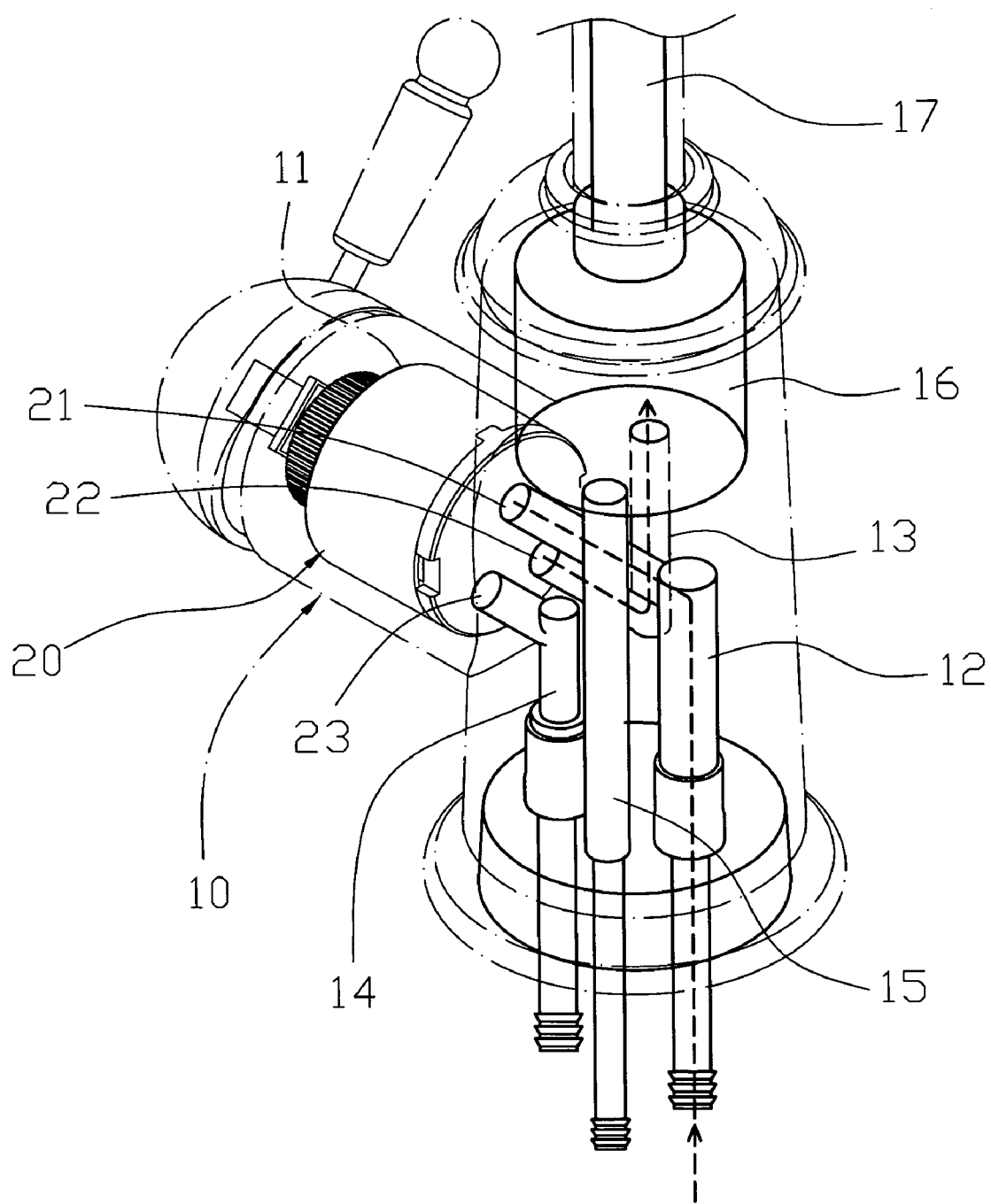
FIG. 2 is a schematic operational view of the drinking water fountain as shown in FIG. 1.

When in use, referring to FIG. 2, when the control valve 20 is rotated to a first position, the filtered water from the water filter 32 flows through the cold water inlet conduit 12 and the water inlet port 21 of the control valve 20 into the control valve 20. Then, the water from the control valve 20 flows through the first water outlet port 22 of the control valve 20 and the cold water outlet conduit 13 into the mixed chamber 16 of the valve body 10. Finally, the water from the mixed chamber 16 of the valve body 10 flows into the water outlet pipe 17. Thus, the cold water flows outward from the water outlet pipe 17 for use.

Figure 3:
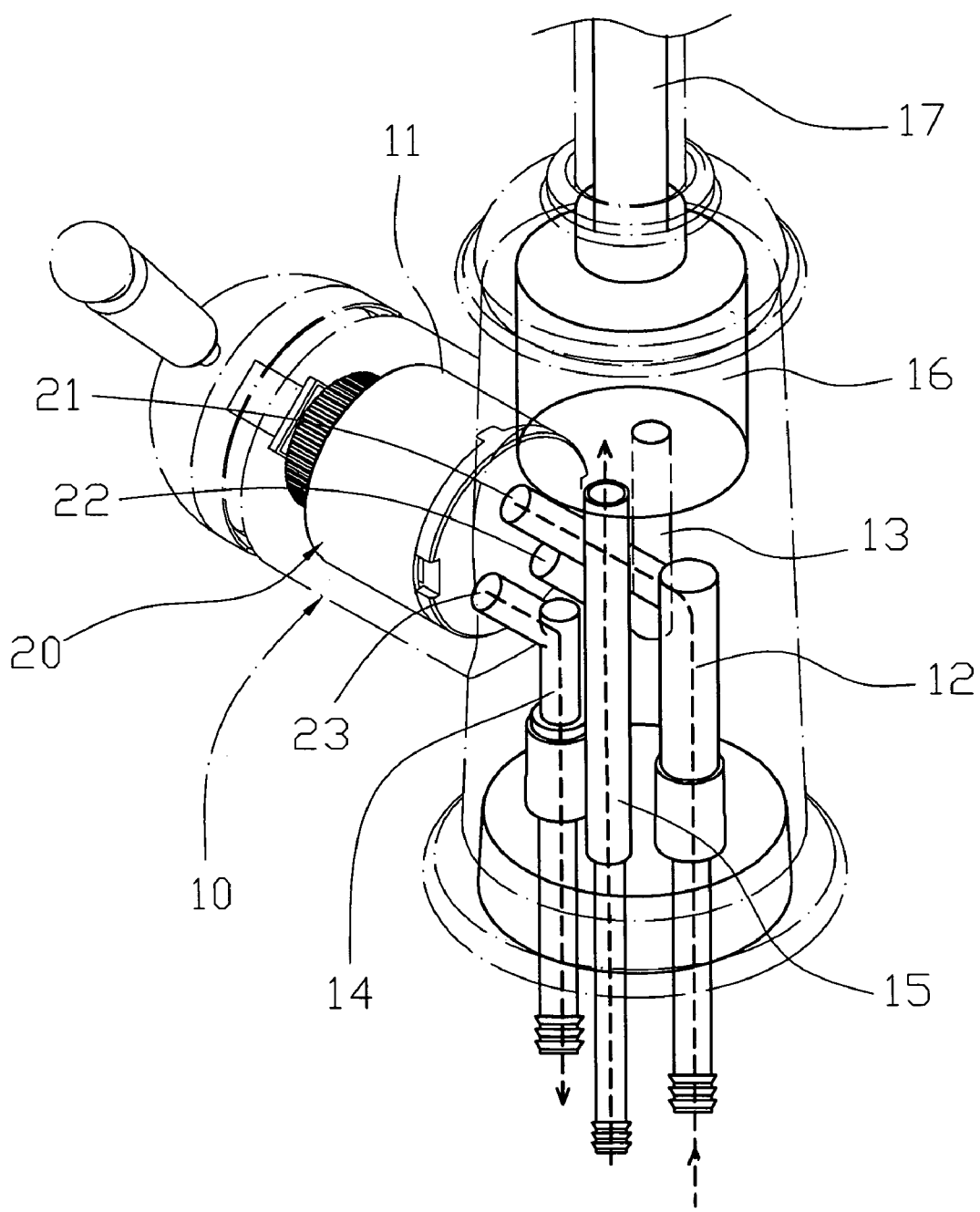
FIG. 3 is a schematic operational view of the drinking water fountain as shown in FIG. 1.

Alternatively, referring to FIG. 3, when the control valve 20 is rotated to a second position, the filtered water from the water filter 32 flows through the cold water inlet conduit 12 and the water inlet port 21 of the control valve 20 into the control valve 20. Then, the water from the control valve 20 flows through the second water outlet port 23 of the control valve 20 and the heating conduit 14 into the heating device 30. Then, the heated water from the heating device 30 flows through the hot water inlet conduit 15 into the mixed chamber 16 of the valve body 10. Finally, the heated water from the mixed chamber 16 of the valve body 10 flows into the water outlet pipe 17. Thus, the hot water flows outward from the water outlet pipe 17 for use.

Figure 4:
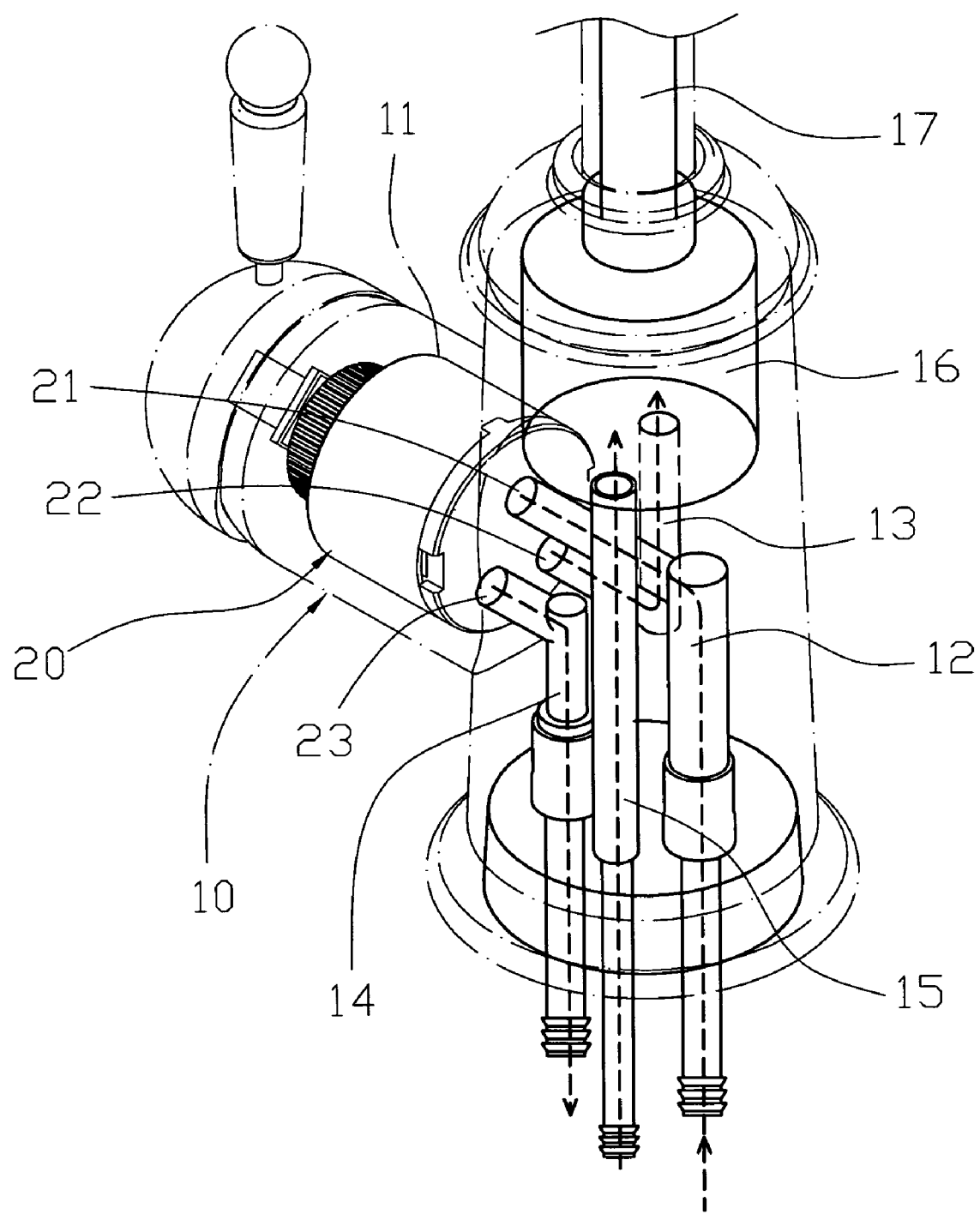
FIG. 4 is a schematic operational view of the drinking water fountain as shown in FIG. 1.

Alternatively, referring to FIG. 4, when the control valve 20 is rotated to a third position, the filtered water from the water filter 32 flows through the cold water inlet conduit 12 and the water inlet port 21 of the control valve 20 into the control valve 20. Then, the water from the control valve 20 partially flows through the first water outlet port 22 of the control valve 20 and the cold water outlet conduit 13 into the mixed chamber 16 of the valve body 10. At the same time, the water from the control valve 20 partially flows through the second water outlet port 23 of the control valve 20 and the heating conduit 14 into the heating device 30 to form hot water which flows through the hot water inlet conduit 15 into the mixed chamber 16 of the valve body 10. At this time, the cold water from the cold water outlet conduit 13 mixes with the hot water from the hot water inlet conduit 15 in the mixed chamber 16 of the valve body 10 to form a mixed water having a proper temperature. Finally, the mixed water from the mixed chamber 16 of the valve body 10 flows into the water outlet pipe 17. Thus, the mixed water flows outward from the water outlet pipe 17 for use.

Figure 5:
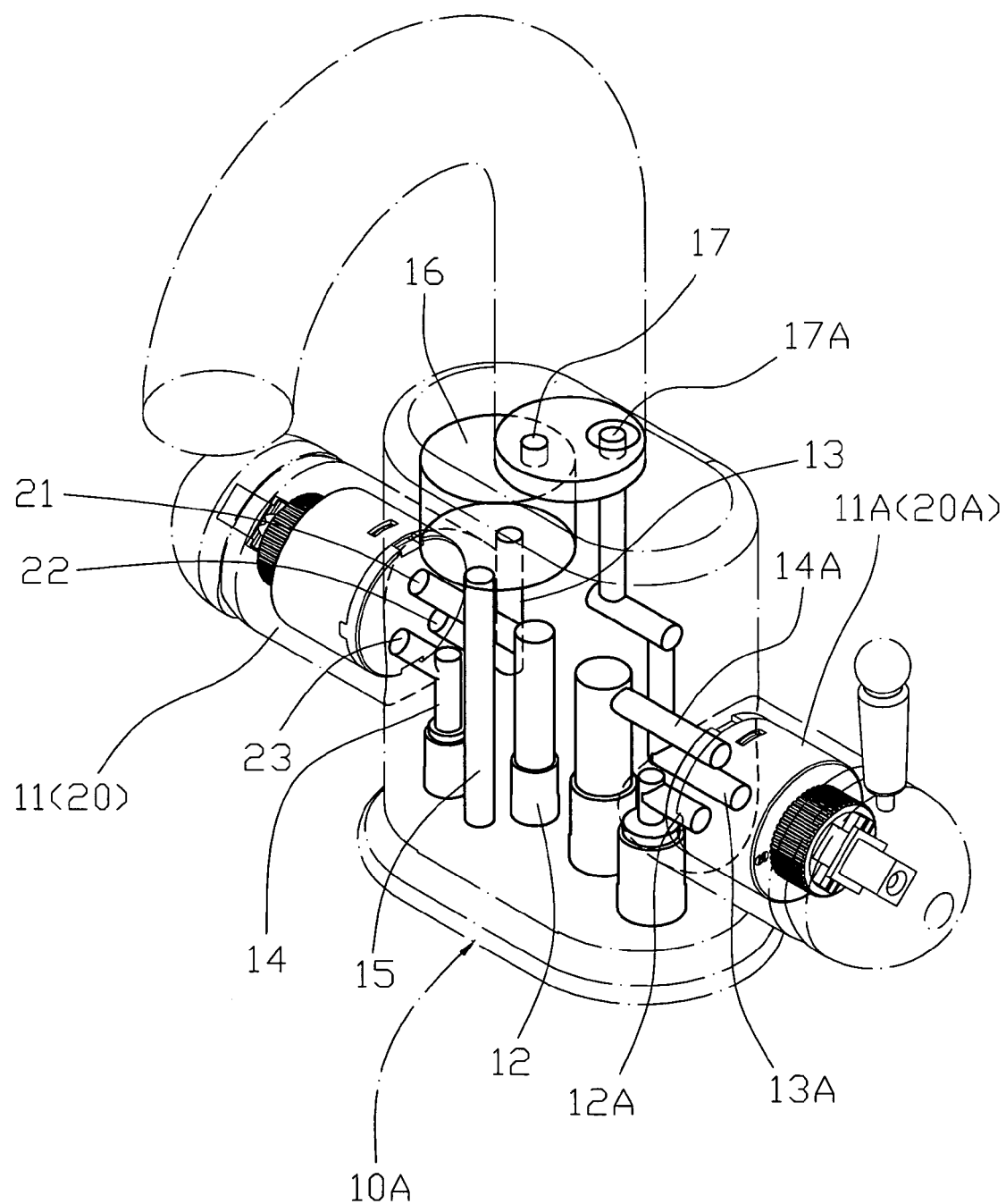
FIG. 5 is a perspective view of a drinking water fountain in accordance with another embodiment of the present invention.

Referring to FIG. 5, a drinking water fountain in accordance with another embodiment of the present invention further comprises a second control valve 20A to control non-drinking water. The valve body 10A has a second side formed with a second valve chamber 11A to receive the second control valve 20A. The drinking water fountain further comprises a second water outlet pipe 17A mounted on the valve body 10A, a second cold water inlet conduit 12A mounted in the valve body 10A and connected to the second water outlet pipe 17A and the second control valve 20A, a second hot water inlet conduit 13A mounted in the valve body 10A and connected to the second water outlet pipe 17A and the second control valve 20A, and a mixed water outlet conduit 14A mounted in the valve body 10A and connected to the second water outlet pipe 17A and the second control valve 20A. Thus, the second control valve 20A is used to control the non-drinking water flowing outward from the second water outlet pipe 17A, including cold water, hot water and mixed water.

Accordingly, the drinking water fountain can provide drinking water, including cold water, hot water and mixed water. In addition, the drinking water fountain can provide non-drinking water, including cold water, hot water and mixed water. Further, the control valve is used to control the drinking water flowing outward from the water outlet pipe, including cold water, hot water and mixed water, thereby facilitating a user drinking the drinking water. Further, the second control valve is used to control the non-drinking water flowing outward from the second water outlet pipe, including cold water, hot water and mixed water, thereby facilitating a user using the non-drinking water.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A drinking water fountain, comprising:
   a valve body having a side formed with a valve chamber, a lower portion provided with a heating device and an upper portion provided with a mixed chamber;
   a control valve rotatably mounted in the valve chamber of the valve body;
   a cold water inlet conduit mounted in the valve body and having a first end connected to a water inlet port of the control valve;
   a cold water outlet conduit mounted in the valve body and having a first end connected to a first water outlet port of the control valve and a second end connected to the mixed chamber of the valve body;
   a heating conduit mounted in the valve body and having a first end connected to a second water outlet port of the control valve and a second end connected to the heating device;
   a hot water inlet conduit mounted in the valve body and having a first end connected to the heating device and a second end connected to the mixed chamber of the valve body.

2. The drinking water fountain in accordance with claim 1, wherein the cold water inlet conduit has a second end connected to a water filter.

3. The drinking water fountain in accordance with claim 1, further comprising a water outlet pipe mounted on the valve body and connected to the mixed chamber of the valve body.

4. The drinking water fountain in accordance with claim 1, wherein the control valve is rotated to a position where filtered water flows through the cold water inlet conduit and the water inlet port of the control valve into the control valve, and then flows through the first water outlet port of the control valve and the cold water outlet conduit into the mixed chamber of the valve body.

5. The drinking water fountain in accordance with claim 1, wherein the control valve is rotated to a position where filtered water flows through the cold water inlet conduit and the water inlet port of the control valve into the control valve, then flows through the second water outlet port of the control valve and the heating conduit into the heating device and then flows through the hot water inlet conduit into the mixed chamber of the valve body.

6. The drinking water fountain in accordance with claim 1, wherein the control valve is rotated to a position where filtered water flows through the cold water inlet conduit and the water inlet port of the control valve into the control valve, so that the water from the control valve partially flows through the first water outlet port of the control valve and the cold water outlet conduit into the mixed chamber of the valve body while the water from the control valve partially flows through the second water outlet port of the control valve and the heating conduit into the heating device to form hot water which flows through the hot water inlet conduit into the mixed chamber of the valve body.

7. The drinking water fountain in accordance with claim 1, further comprising a second control valve rotatably mounted on the valve body to control non-drinking water.

8. The drinking water fountain in accordance with claim 7, wherein the valve body has a second side formed with a second valve chamber to receive the second control valve.

9. The drinking water fountain in accordance with claim 7, further comprising a water outlet pipe mounted on the valve body and connected to the mixed chamber of the valve body, a second water outlet pipe mounted on the valve body, a second cold water inlet conduit mounted in the valve body and connected to the second water outlet pipe and the second control valve, a second hot water inlet conduit mounted in the valve body and connected to the second water outlet pipe and the second control valve, and a mixed water outlet conduit mounted in the valve body and connected to the second water outlet pipe and the second control valve.

* * * * *